US012746764B2

(12) United States Patent
Murashima et al.

(10) Patent No.: US 12,746,764 B2
(45) Date of Patent: Sep. 29, 2026

(54) SHEET DRYING APPARATUS AND IMAGE FORMING SYSTEM PROVIDED THEREWITH

(71) Applicant: KYOCERA Document Solutions Inc., Osaka (JP)

(72) Inventors: Masaki Murashima, Osaka (JP); Minoru Tokonami, Osaka (JP); Hiroyuki Ueda, Osaka (JP); Mitsuhiro Goda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 129 days.

(21) Appl. No.: 19/014,610

(22) Filed: Jan. 9, 2025

(65) Prior Publication Data

US 2025/0229546 A1 Jul. 17, 2025

(30) Foreign Application Priority Data

Jan. 17, 2024 (JP) ................................ 2024-005593

(51) Int. Cl.
*B41J 11/00* (2006.01)

(52) U.S. Cl.
CPC ................................ *B41J 11/0022* (2021.01)

(58) Field of Classification Search
CPC .................................................. B41J 11/0022
See application file for complete search history.

(56) References Cited

U.S. PATENT DOCUMENTS

2018/0264849 A1* 9/2018 Kitaoka .................. B41F 23/04
2025/0229547 A1* 7/2025 Murashima ........ B41J 11/00216

FOREIGN PATENT DOCUMENTS

JP 2021-067395 A 4/2021
JP 2023-117016 A 8/2023

* cited by examiner

*Primary Examiner* — Jason S Uhlenhake
*Assistant Examiner* — Rami A Alshoroogi
(74) *Attorney, Agent, or Firm* — Stein IP, LLC

(57) ABSTRACT

A sheet drying apparatus includes a first conveyance portion, a drying portion, a suction fan, an exhaust portion, first and second ducts, a separation fan, a separation duct, a cooling fan, and a cooling duct. The separation fan separates a sheet from the first conveyance portion at a separation position. The separation duct communicates the separation fan with the separation position. The cooling fan cools the suction fan. The cooling duct communicates the cooling fan with the suction fan. The suction fan and the second duct are arranged downstream of the drying portion. The separation fan, the separation duct, the cooling fan, and the cooling duct are arranged downstream of the suction fan and the second duct. The separation duct and the cooling duct are arranged so that at least parts of them overlap with each other as viewed from the width direction horizontally orthogonal to the conveyance direction.

10 Claims, 9 Drawing Sheets

SHEET DRYING APPARATUS AND IMAGE FORMING SYSTEM PROVIDED THEREWITH

INCORPORATION BY REFERENCE

This application is based on and claims the benefit of priority from Japanese Patent Application No. 2024-005593 filed on Jan. 17, 2024, the contents of which are hereby incorporated by reference.

BACKGROUND

The present disclosure relates to a sheet drying apparatus that dries sheets on which images have been printed in an inkjet recording apparatus or the like, and to an image forming system provided with such a sheet drying apparatus.

As recording apparatuses such as facsimile machines, copiers, and printers, inkjet recording apparatuses, which form images by ejecting ink onto a sheet, are widely used. Sheet drying apparatuses are known for heating and drying sheets (paper) on which ink has been adhered by inkjet recording apparatuses.

SUMMARY

According to one aspect of the present disclosure, a sheet drying apparatus includes a first conveyance portion, a drying portion, a suction fan, an exhaust portion, first and second ducts, a separation fan, a separation duct, a cooling fan, and a cooling duct. The first conveyance portion conveys a sheet on which an image is formed with ink containing moisture. The drying portion is arranged opposite the first conveyance portion and heats and dries the sheet. The suction fan sucks in air containing water vapor present in a drying space between the first conveyance portion and the drying portion. The exhaust portion discharges the air sucked in by the suction fan. The first duct communicates the drying space with the suction fan. The second duct communicates the suction fan with the exhaust portion. The separation fan blows air to the sheet being conveyed by the first conveyance portion to separate the sheet from the first conveyance portion at a separation position. The separation duct communicates the separation fan with the separation position. The cooling fan blows ambient air to cool the suction fan. The cooling duct communicates the cooling fan with the suction fan. The suction fan and the second duct are arranged downstream of the drying portion with respect to the conveyance direction of the sheet. The separation fan, the separation duct, the cooling fan, and the cooling duct are arranged downstream of the suction fan and the second duct with respect to the conveyance direction. The separation duct and the cooling duct are arranged so that at least parts of them overlap with each other as viewed from the width direction horizontally orthogonal to the conveyance direction.

DETAILED DESCRIPTION

Figure 1:
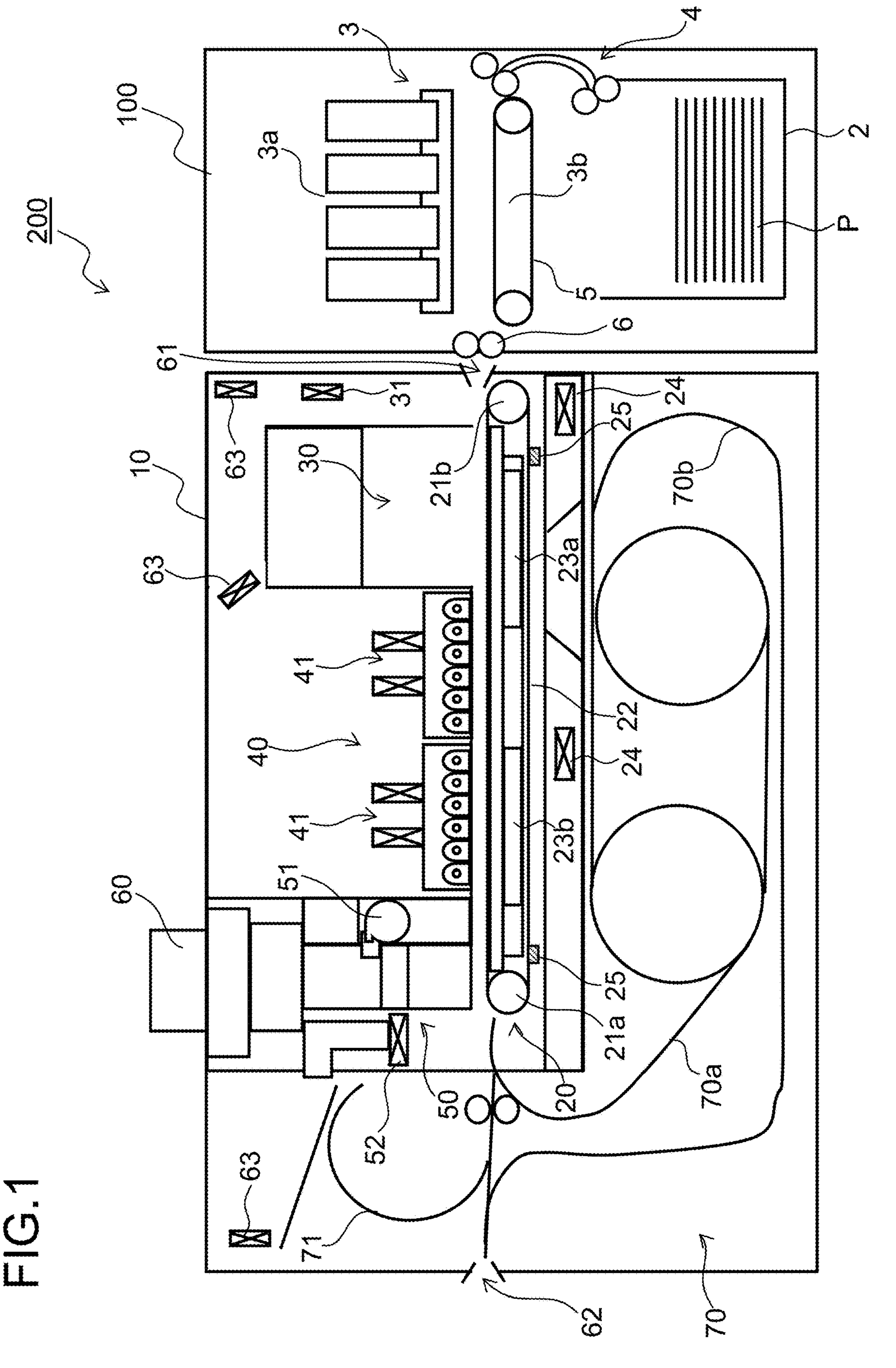
FIG. 1 is a schematic diagram showing the internal construction of an image forming system including a sheet drying apparatus of the present disclosure.
Figure 2:
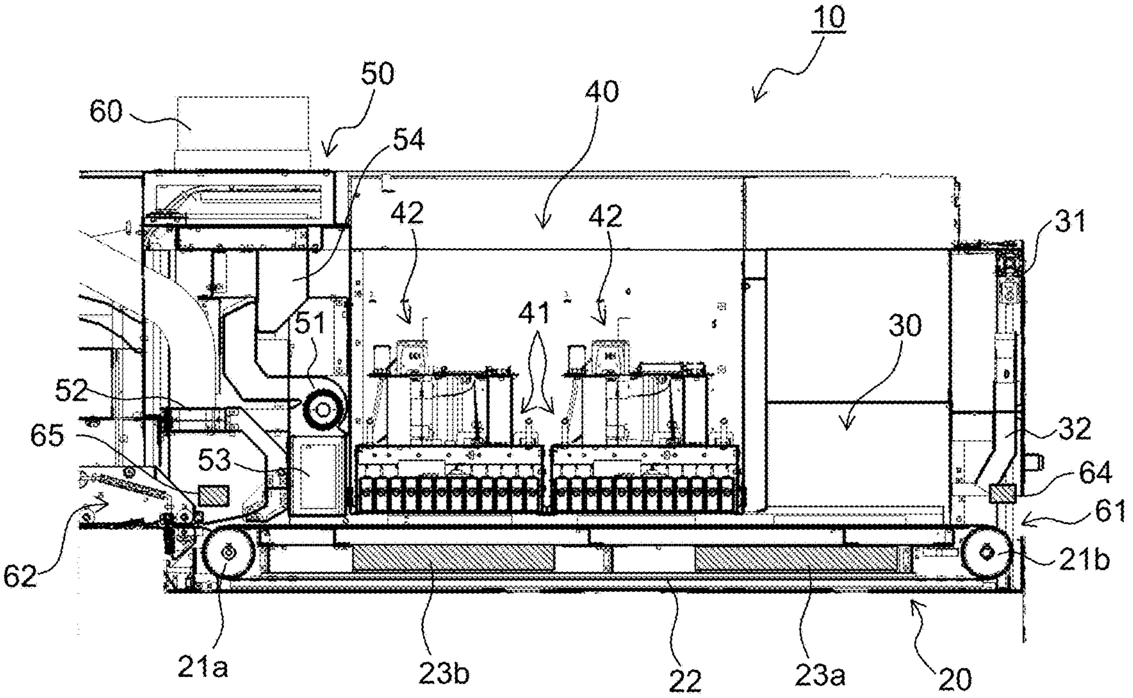
FIG. 2 is a side sectional view around a drying portion in the sheet drying apparatus according to one embodiment of the present disclosure.

1. Construction of an Image Forming System Including a Sheet Drying Apparatus: An embodiment of the present disclosure will be described below with reference to the accompanying drawings. FIG. 1 is a schematic diagram showing the internal construction of an image forming system 200 including a sheet drying apparatus 10 of the present disclosure. FIG. 2 is a side sectional view around a drying portion 40 in the sheet drying apparatus 10 according to one embodiment of the present disclosure. The image forming system 200 configured with an image forming apparatus 100 and the sheet drying apparatus 10 will be described with reference to FIGS. 1 and 2.

The image forming apparatus 100 is an inkjet recording printer and includes a sheet storage portion 2 arranged in a bottom part of the image forming apparatus 100, an image forming portion 3 arranged above the sheet storage portion 2, and a sheet feed portion 4 that feeds a sheet P stored in the sheet storage portion 2 to the image forming portion 3.

The image forming portion 3 is configured with a recording portion **3*a* having a plurality of recording heads and a print conveyance portion 3*b* arranged opposite the recording portion 3*a*. The print conveyance portion 3*b* includes an endless print conveyance belt 5 stretched around a plurality of rollers including a driving roller. The sheet P conveyed by the sheet feed portion 4 is conveyed below the recording portion 3*a* by being held under suction on the print conveyance belt 5 by a sheet suction portion (not shown) arranged inward of the print conveyance belt 5. The sheet P having a predetermined image recorded to it by the image forming portion 3 is discharged through a pair of discharge rollers 6 and is conveyed into the sheet drying apparatus 10**.

The sheet drying apparatus 10 is arranged adjacent to the image forming apparatus 100 and dries the ink on the sheet P discharged from the image forming apparatus 100. The sheet drying apparatus 10 includes a first conveyance portion 20, a preliminary drying portion 30, a drying portion 40, a suction fan unit 50, and a second conveyance portion 70.

The first conveyance portion 20 includes a driving roller **21*a*, a driven roller 21*b*, and a conveyance belt 22. The conveyance belt 22 is stretched around the driving roller 21*a* arranged on the downstream side and the driven roller 21*b*** arranged on the upstream side with respect to the conveyance direction of the sheet P (right to left direction in FIG. 1; hereinafter, referred to simply as the conveyance direction).

Inward of the conveyance belt 22 is arranged sheet suction portions 23*a* and 23*b*. In the conveyance belt 22, many suction holes (not shown) are formed through which to pass suction air for sucking the sheet P onto the conveyance belt 22 by negative pressure suction by the sheet suction portions 23*a* and 23*b*.

Belt cooling fans 24 are arranged at two places below the conveyance belt 22. A belt temperature sensor 25 is arranged adjacent to a bottom face of the conveyance belt 22. The belt cooling fan 24 blows cooling air to the conveyance belt 22 when the sensed temperature of the belt temperature sensor 25 reaches or exceeds a predetermined temperature.

The preliminary drying portion 30 is arranged closely downstream of a sheet loading port 61 with respect to the conveyance direction and preliminarily dries the ink on the sheet P conveyed in through the sheet loading port 61. The preliminary drying portion 30 includes a sheet blowing fan 31 and a sheet blowing duct 32 for blowing air from above the sheet P.

The drying portion 40 is arranged adjacently downstream of the preliminary drying portion 30 with respect to the conveyance direction and dries the ink on the sheet P having passed through the preliminary drying portion 30. The drying portion 40 includes two heating units 41 arranged on a top surface of the conveyance belt 22 so as to face each other.

The suction fan unit 50 sucks in the water vapor emanating from the sheet P passing through the drying portion 40. The suction fan unit 50 includes a suction fan 51 that sucks in air containing water vapor inside the drying portion 40 and a separation fan 52 that blows separation air for separating the sheet P from the conveyance belt 22. The suction fan unit 50 communicates with a space between the conveyance belt 22 and the heating unit 41 via a first duct 53 and communicates with an exhausting port 60 formed in a top part of the sheet drying apparatus 10 via a second duct 54. The configuration of the suction fan unit 50 will be described in detail later.

A plurality of ambient air intake fans 63 for taking in ambient air into the sheet drying apparatus 10 are arranged at appropriate places in the sheet drying apparatus 10. In an upstream and a downstream part of the first conveyance portion 20 are arranged sheet detection sensors 64 and 65. The sheet detection sensors 64 and 65 detect the sheet P having passed through the sheet loading port 61 and the sheet discharge port 62.

As, by being driven to rotate by the driving roller 21*a*, the conveyance belt 22 rotates in the counterclockwise direction, the sheet P conveyed in through the sheet loading port 61 passes through the preliminary drying portion 30, then through the drying portion 40 and then through the suction fan unit 50 to be discharged through the sheet discharge port 62 out of the sheet drying apparatus 10 or conveyed into the second conveyance portion 70.

The second conveyance portion 70 is arranged below the drying portion 40 and the preliminary drying portion 30 across the first conveyance portion 20. The second conveyance portion 70 includes a reversing conveyance passage 70*a*, for reversing top side down the sheet P on which the ink has been dried, and a duplex conveyance passage 70*b*, for returning, when duplex printing is performed on the sheet P, the sheet P reversed top side down to the image forming apparatus 100.

Downstream (left side in FIG. 1) of the suction fan unit 50 with respect to the conveyance direction is provided a retraction path 71 in the shape of an arc. The retraction path 71 is where a sheet P (waste sheet) that has become useless due to a printing defect or the like in the image forming apparatus 100 is retracted and stored.

Figure 3:
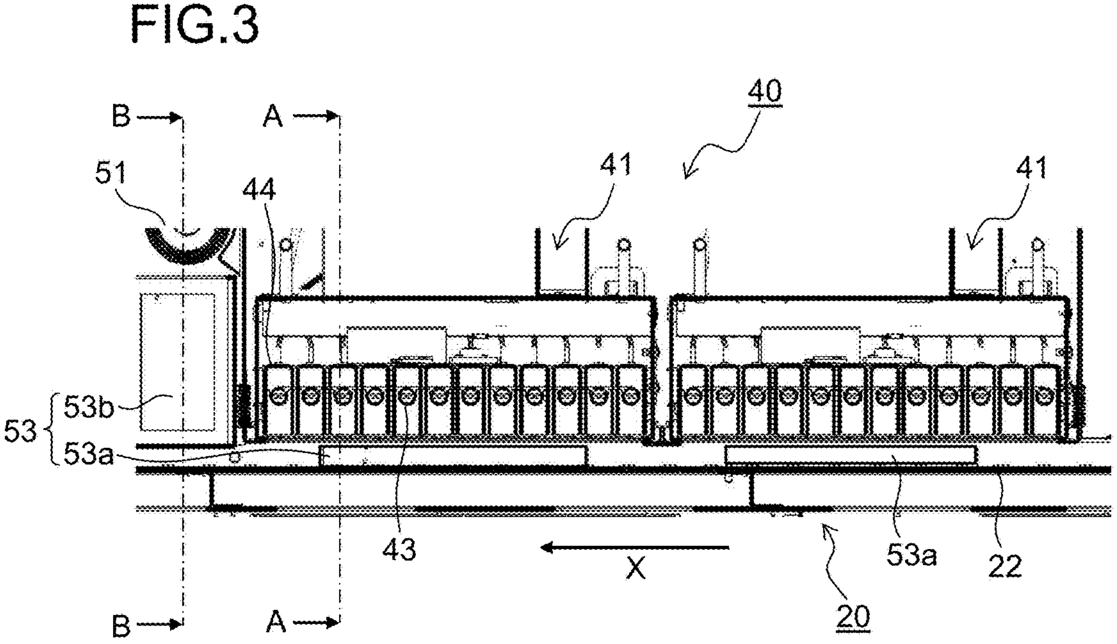
FIG. 3 is an enlarged view of the drying portion in FIG. 2.

2. Construction of the Sheet Drying Apparatus: FIG. 3 is an enlarged view of the drying portion 40 in FIG. 2. The drying portion 40 includes a heating unit 41 and a hot air fan 42 (see FIG. 2). Two heating units 41 are arranged along the conveyance direction (arrow-X direction). The heating unit 41 includes a heater 43 and a reflector 44.

The heater 43 is in the shape of a bar extending in the sheet width direction (the direction orthogonal to the plane in FIG. 3; hereinafter, referred to simply as the width direction) horizontally orthogonal to the conveyance direction. In the heating unit 41, a plurality (12 in this embodiment) of heaters 43 are arranged side by side along the conveyance direction. In this embodiment, an infrared heater is used as the heater 43.

The reflector 44 is a reflector plate U-shaped as seen in a side view arranged so as to surround the heater 43 from above. The infrared rays emitted from the heater 43 are reflected downward by the inner surface of the reflector 44 and are shone onto the sheet P carried and conveyed on the conveyance belt 22. Thus, the moisture in the ink on the sheet P evaporates and the ink dries; thus, the ink is fixed to the sheet P.

The hot air fan 42 is arranged above the heating unit 41. More specifically, the hot air fan 42 is arranged so as to blow air from above toward the reflectors 44. The air blown from the hot air fan 42 onto the reflectors 44 is heated as it passes through the gaps between the reflectors 44 become hot air to flow into the gap (drying space) between the heating unit 41 and the conveyance belt 22.

If steam or water vapor is present in the gap between the heating unit 41 and the conveyance belt 22, the infrared rays emitted from the heater 43 and reflected from the reflector 44 are absorbed by the steam or water vapor and this impairs their ability to dry the ink on the sheet P. Thus, by operating the hot air fan 42 to blow hot air into the gap between the heating unit 41 and the conveyance belt 22 and scattering and removing the steam or water vapor emanating from the sheet P, it is possible to maintain the drying properties of the ink under infrared rays.

Between the drying portion 40 and the suction fan unit 50, a first duct 53 is provided for sucking the steam or water vapor emanating from the sheet P together with air. The first duct 53 is composed of a main body-side first duct 53*a* and a unit-side first duct 53*b*. The main body-side first duct 53*a* extends from the gap between the heating unit 41 and the conveyance belt 22 to the suction fan unit 50. The unit-side first duct 53*b* is provided in the suction fan unit 50 and permits the main body-side first duct 53*a* to communicate with the suction fan 51 in the suction fan unit 50.

Figure 4:
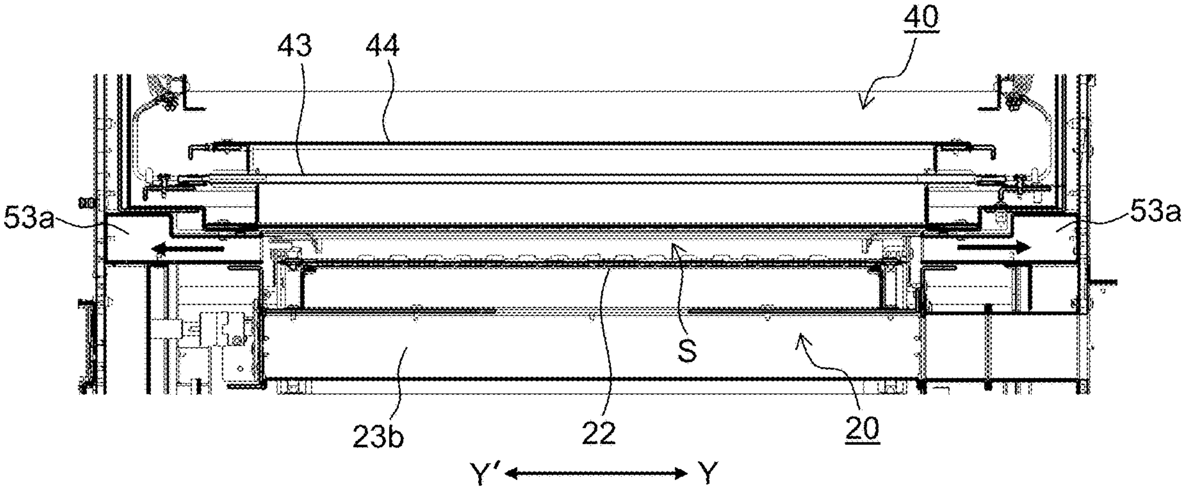
FIG. 4 is a side sectional view of a first conveyance portion and the drying portion as cut along the sheet width direction.
Figure 5:
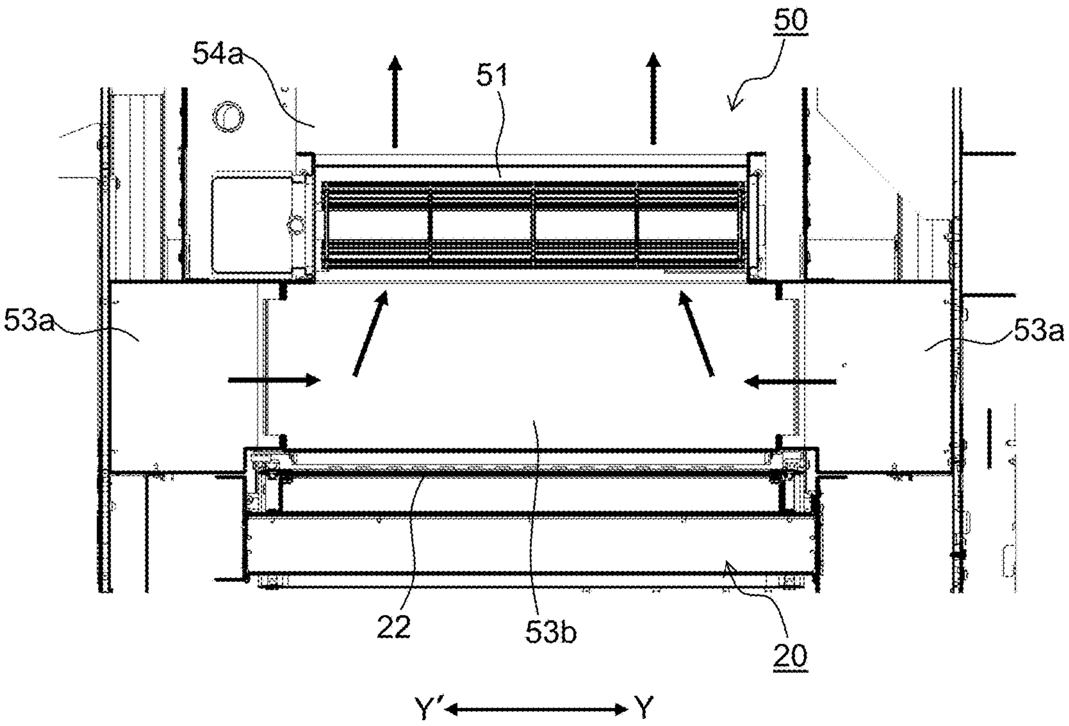
FIG. 5 is a side sectional view of the first conveyance portion and a suction fan unit as cut along the sheet width direction.
Figure 6:
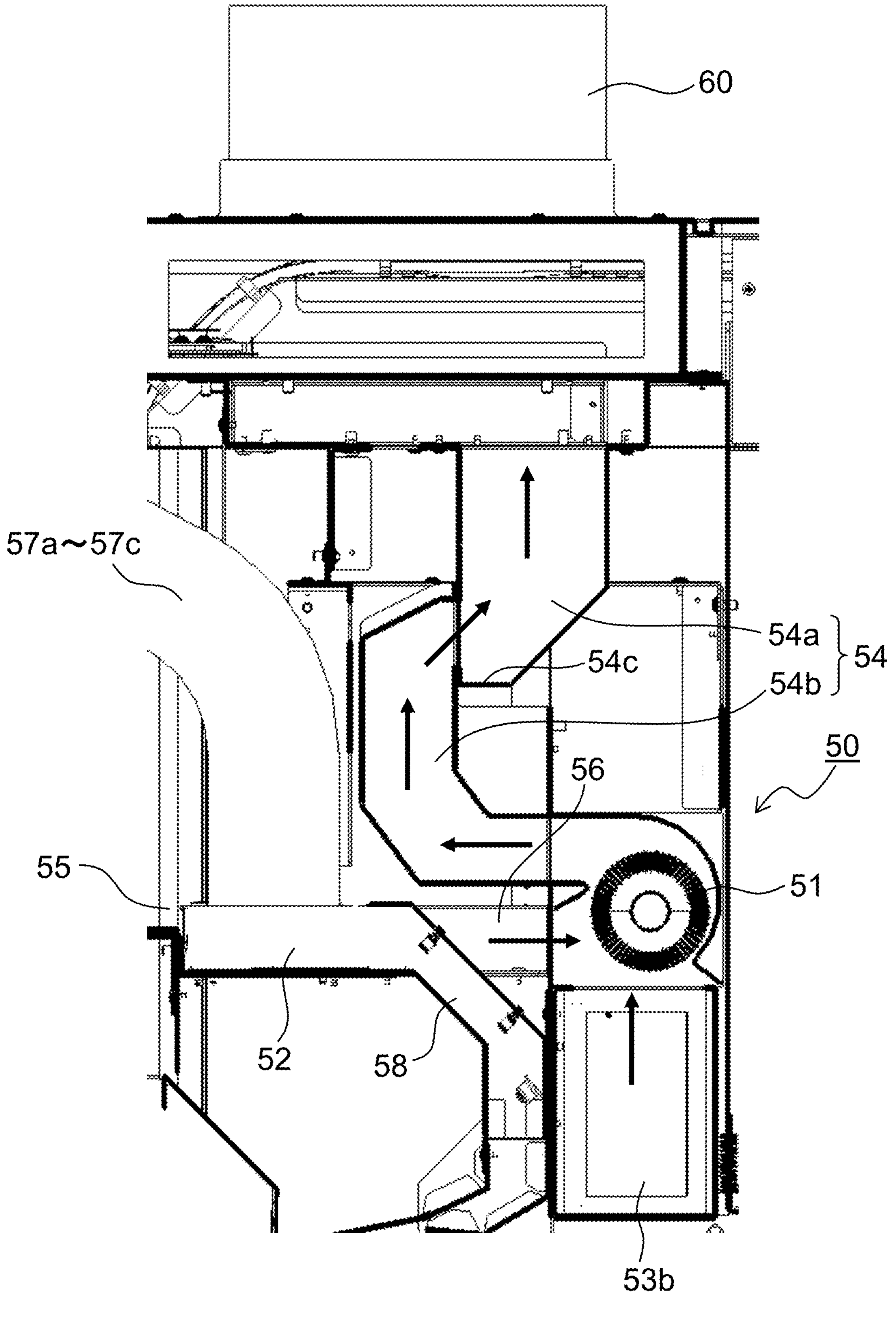
FIG. 6 is a side sectional view around the suction fan unit as cut along the conveyance direction.

FIG. 4 is a side sectional view of the first conveyance portion 20 and the drying portion 40 as cut along the sheet width direction (i.e., a sectional view as seen from arrows AA in FIG. 3). FIG. 5 is a side sectional view of the first conveyance portion 20 and the suction fan unit 50 as cut along the sheet width direction (i.e., a sectional view as seen from arrows BB in FIG. 3). FIG. 6 is a side sectional view around the suction fan unit 50 as cut along the conveyance direction. The discharge path for air containing water vapor emanating from the drying portion 40 will be described with reference to FIGS. 4 and 6. The arrows in FIGS. 4 to 6 indicate the flow of air.

The water vapor emanating when the sheet P is dried is present in a drying space S between the heating unit 41 and the conveyance belt 22. As shown in FIG. 4, when the suction fan 51 is driven to rotate, the air containing water vapor in the drying space S is sucked horizontally in the width direction from the front and rear sides of the sheet drying apparatus 10 (i.e., arrow YY' direction in the figures) into the main body-side first duct 53*a*.

As shown in FIGS. 5 and 6, the air that has passed through the main body-side first duct 53*a* passes through the unit side first duct 53*b* in the suction fan unit 50 and is sucked into the suction fan 51. Above the suction fan 51, a second duct 54 is provided to that communicates the suction fan 51 with the exhaust port 60.

The second duct 54 is composed of a unit-side second duct 54*b* and a main body-side second duct 54*a*. The unit-side second duct 54*b* extends upward from the suction fan 51 inside the suction fan unit 50. The main body-side second duct 54*a* communicates the unit-side second duct 54*b* with the exhaust port 60. The air containing water vapor sucked by the suction fan 51 passes through the unit-side second duct 54*b* and then through the main body-side second duct 54*a* to be discharged through the exhaust port 60 out of the sheet drying apparatus 10.

The air containing water vapor sucked by the suction fan 51, after passing through the main body-side second duct 54*a*, may mix with ambient air to be cooled before being discharged from the exhaust port 60 and cause condensation. Meanwhile, to prevent the water condensed on an inner wall surface of the main body-side second duct 54*a* from flowing back to the suction fan 51, a storage portion 54*c* is formed in the main body-side second duct 54*a*. The storage portion 54*c* is in a shape of depression that can store liquid and the water condensed on the inner wall surface of the main body-side second duct 54*a* and flowing down is blocked by the storage portion 54*c* and does not flow back to the suction fan 51.

Figure 11:
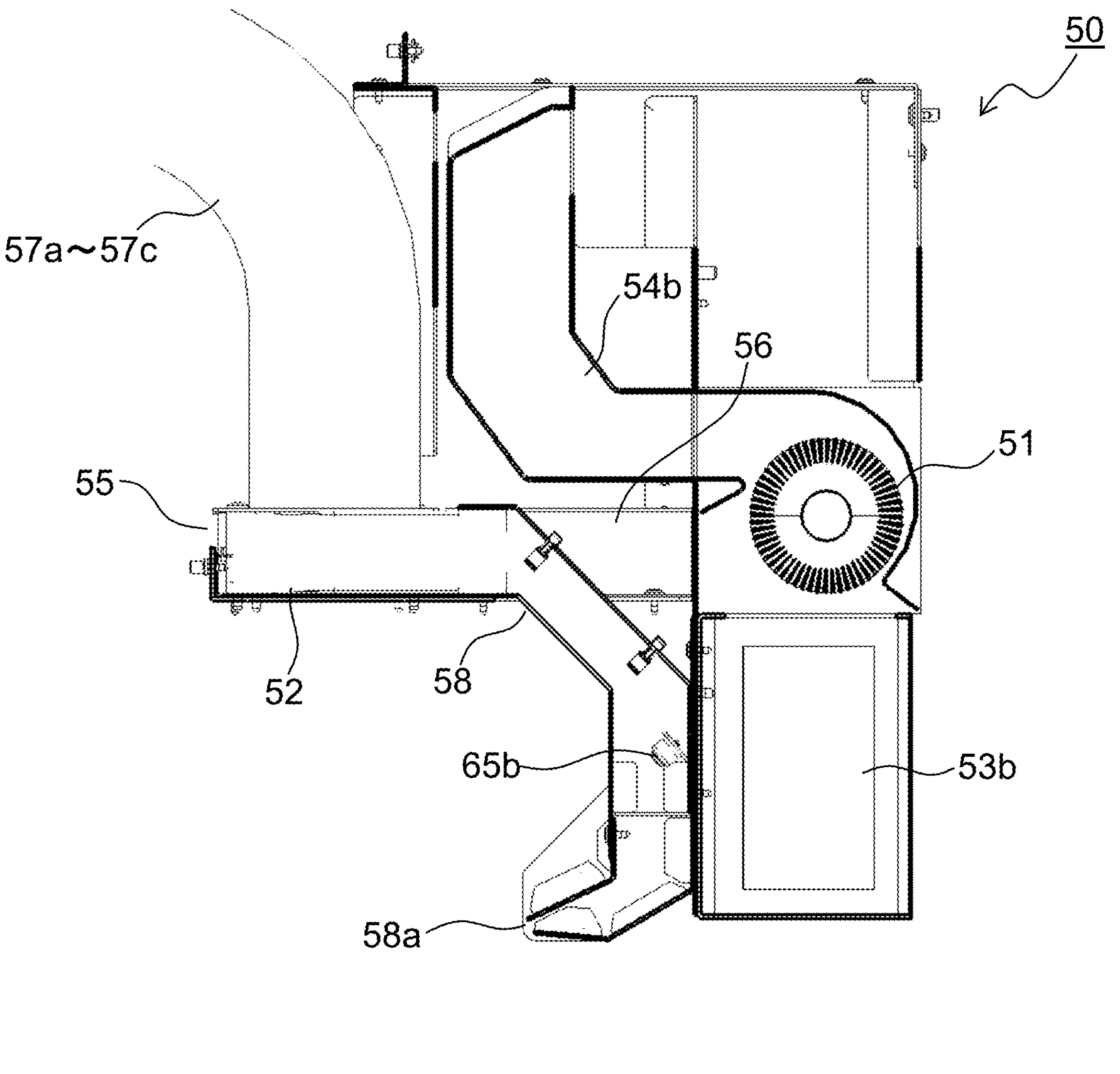
FIG. 11 is a side sectional view of the suction fan unit as cut across a part of it including a separation fan.

The suction fan unit 50 further includes a cooling fan 55 and a cooling duct 56. Two cooling fans 55 are provided in the suction fan unit 50 and blow ambient air to the suction fan 51 via suction ducts 57*a* and 57*b* (see FIG. 9) and the cooling duct 56, respectively. This cools the suction fan 51 and prevents the suction fan 51 from becoming hot due to air containing water vapor. In FIGS. 6 and 11, of which the latter will be referred to later, the cooling fan 55 overlaps with the separation fan 52.

Figure 7:
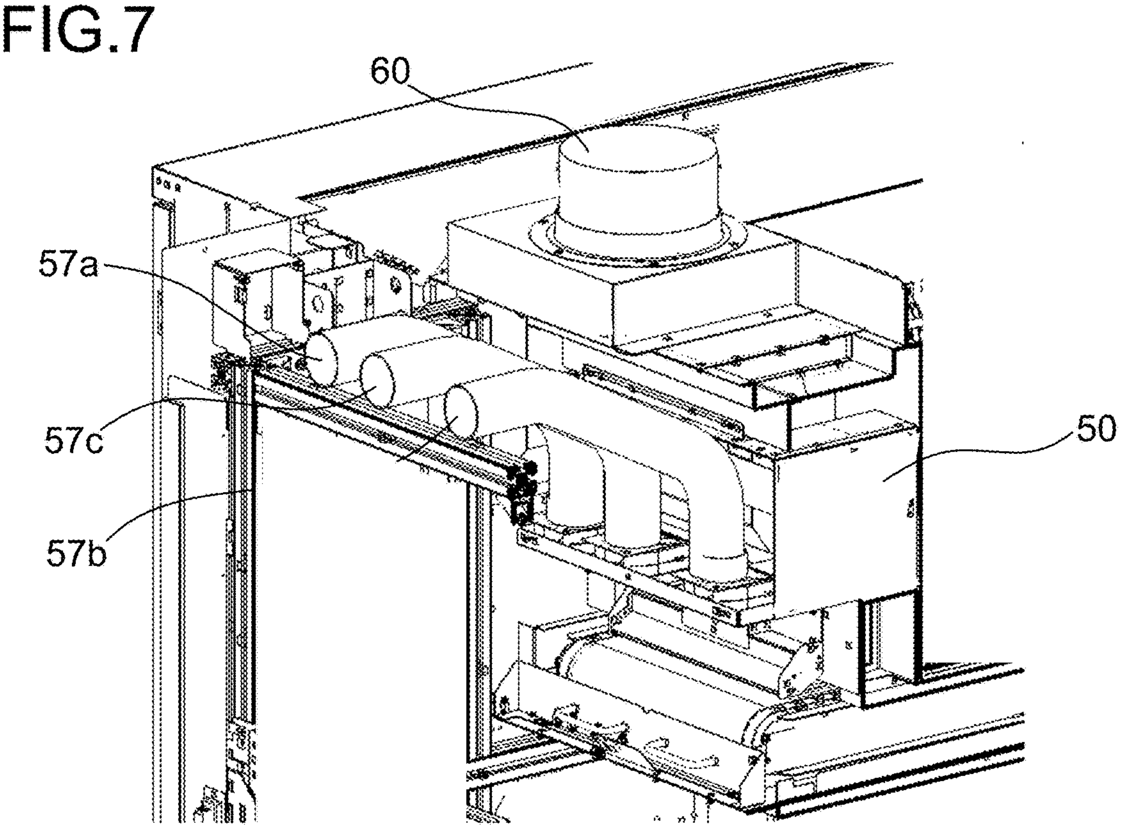
FIG. 7 is a perspective view around the suction fan unit in the sheet drying apparatus.
Figure 8:
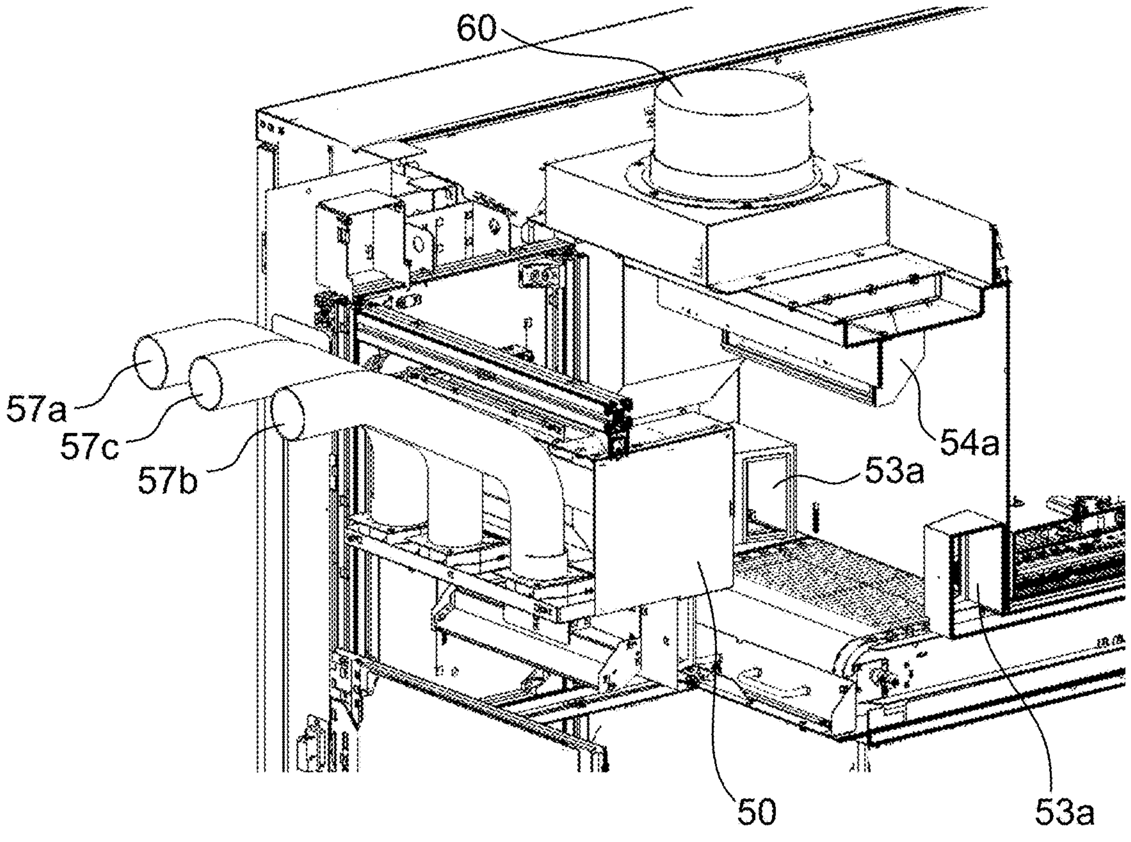
FIG. 8 is a perspective view showing a state in which the suction fan unit is being removed from the state in FIG. 7.

3. Construction of the Suction Fan Unit: FIG. 7 is a perspective view around the suction fan unit 50 in the sheet drying apparatus 10. FIG. 8 is a perspective view showing a state in which the suction fan unit 50 is being removed from the state in FIG. 7. As shown in FIG. 8, the suction fan unit 50 is removably attachable in the horizontal direction with respect to the main body of the sheet drying apparatus 10.

More specifically, when the suction fan unit 50 is removed in the horizontal direction, the first duct 53 is separated into the main body-side first duct 53*a* and the unit-side first duct 53*b*. The second duct 54 is separated into the main body-side second duct 54*a* and the unit-side second duct 54*b*. Removing the suction fan unit 50 permits access to the main body-side second duct 54*a*, so it is then possible to remove the water collected in the storage portion 54*c* in the main body-side second duct 54*a*.

Figure 9:
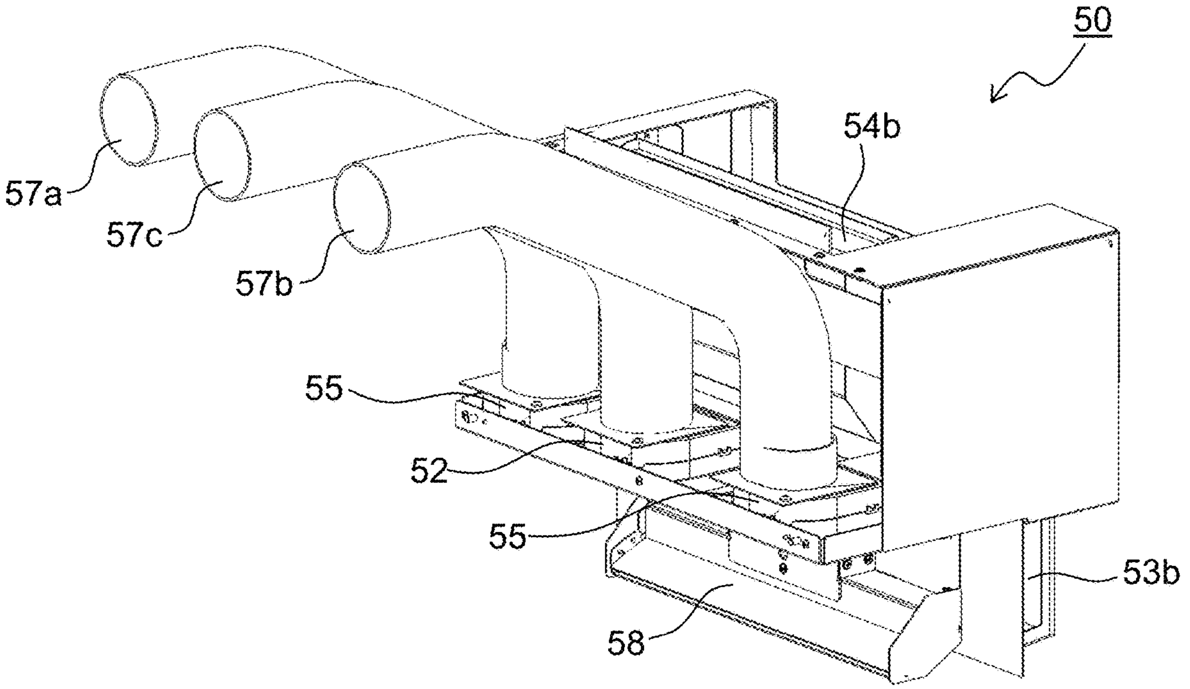
FIG. 9 is a perspective view of the suction fan unit.
Figure 10:
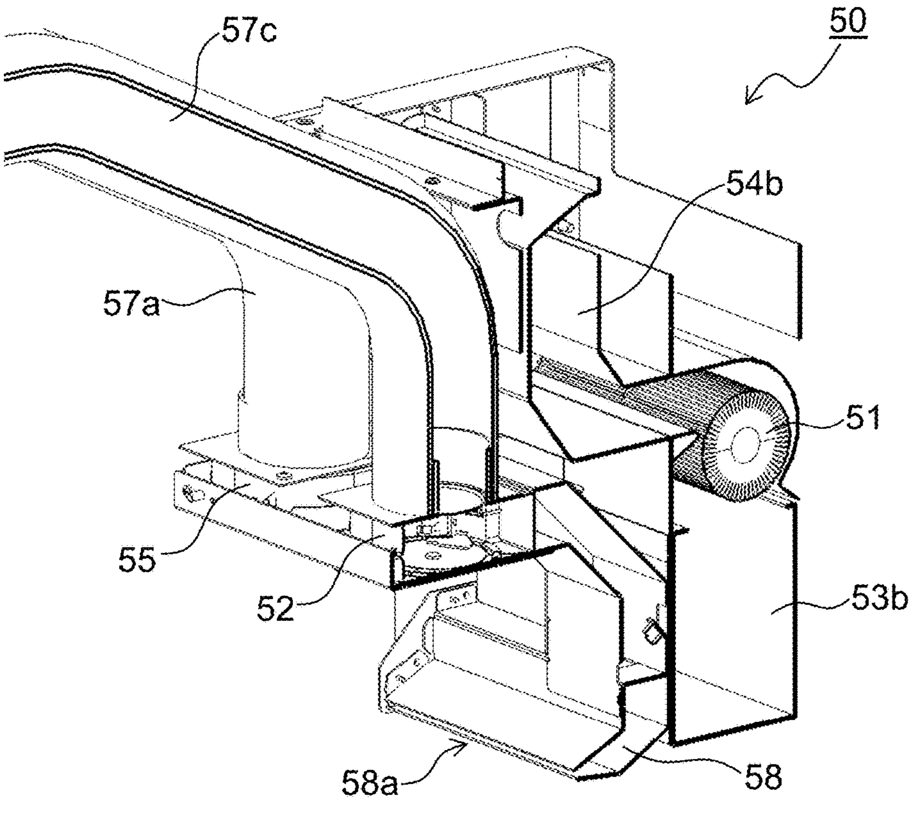
FIG. 10 is a sectional perspective view of the suction fan unit as cut across a part of it including a separation fan.

FIG. 9 is a perspective view of the suction fan unit 50. FIGS. 10 and 11 are a sectional perspective view and a side sectional view, respectively, of the suction fan unit 50 as cut across a part of it including the separation fan 52. The suction fan unit 50 includes the section fan 51, the separation fan 52, the unit-side first duct 53*a*, the unit-side second duct 54*a*, the cooling fan 55, the cooling duct 56, suction ducts 57*a* to 57*c*, and a separation duct 58.

As shown in FIGS. 9 and 10, the separation fan 52 is arranged between the two cooling fans 55. The separation fan 52 communicates with the suction duct 57*c* and with the separation duct 58, and sucks ambient air via the suction duct 57*c* and blows it into the separation duct 58. Inside the separation duct 58 is arranged a light-receiving portion 65*b* of the sheet detection sensor 65.

Figure 12:
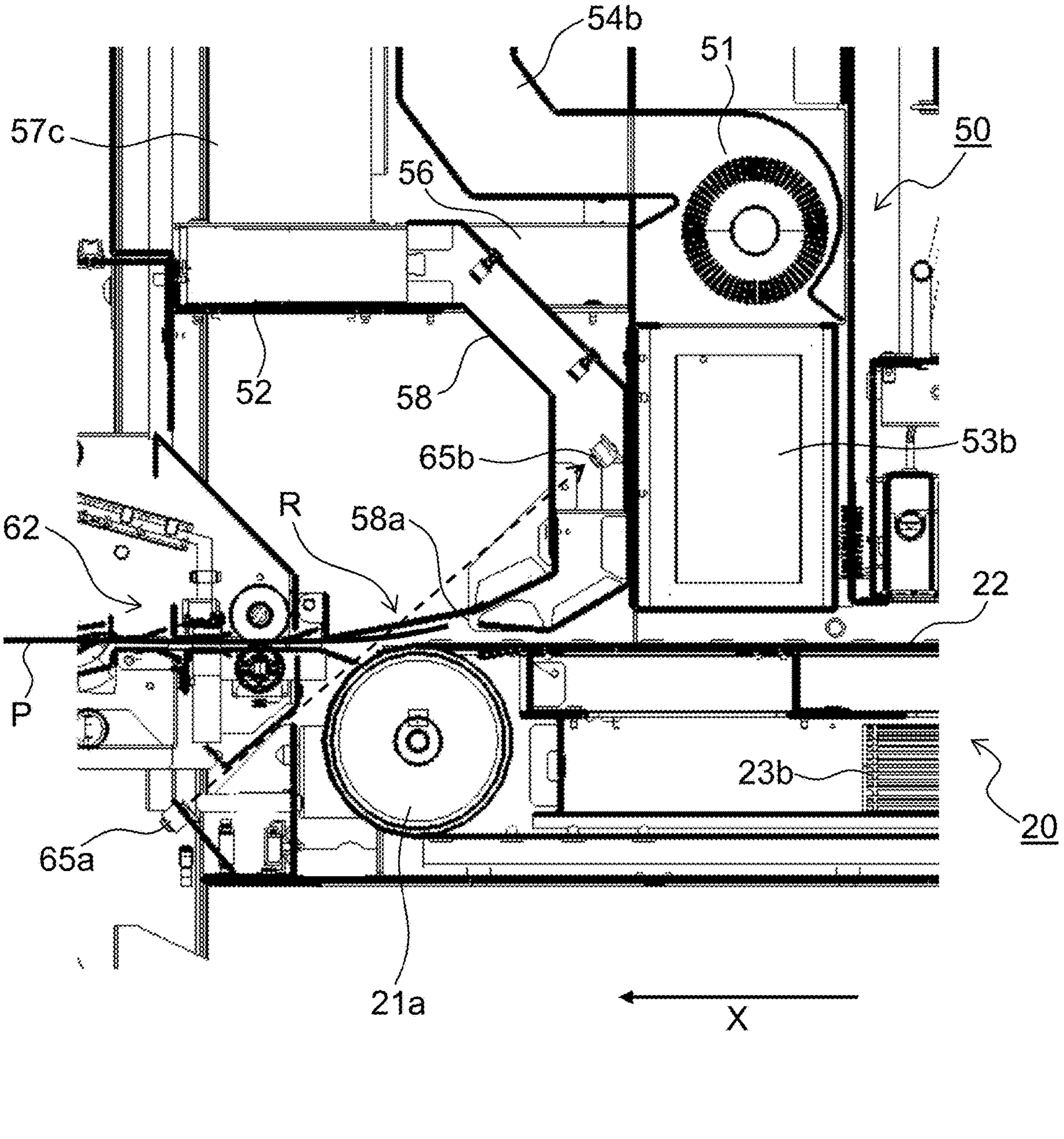
FIG. 12 is a side sectional view around the suction fan unit and a sheet discharge port as cut along the conveyance direction.

FIG. 12 is a side sectional view around the suction fan unit 50 and the sheet discharge port 62 as cut along the conveyance direction. At the place where the sheet P is delivered from the conveyance belt 22 to the sheet discharge port 62, a separation mechanism is required for separating the sheet P from the conveyance belt 22. The air having passed through the separation duct 58 is blown on the top face of the sheet P from a separation air blowing port 58*a* at a downstream end part (separation position R) of the conveyance belt 22. This produces a negative pressure (reduced pressure) above the sheet P, so that the sheet P can be easily separated from the conveyance belt 22.

Downstream (left side in FIG. 12) of the conveyance belt 22 in the conveyance direction, below the sheet discharge port 62, is arranged a light-emitting portion 65*a* of the sheet detection sensor 65. The sheet detection sensor 65 is an optical sensor that has its light-emitting portion 65*a* and light-receiving portion 65*b* separated. If a sheet P jams (paper is stuck) between the conveyance belt 22 and the sheet discharge port 62, the optical path (indicated by a broken line in FIG. 12) between the light-emitting portion 65*a* and the light-receiving portion 65*b* is kept shielded from light by the sheet P. It is thus possible to detect a jam of the sheet P.

By providing the light-receiving portion 65*b* of the sheet detection sensor 65 inside the separation duct 58, it is possible to prevent the light-receiving portion 65*b* from becoming hot due to the heat from the drying portion 40. As a result, the light-receiving portion 65*b* is less likely to deteriorate or break down due to heat.

Swapping the positions of the light-emitting portion 65*a* and the light-receiving portion 65*b* of the sheet detection sensor 65 permits the light-emitting portion 65*a* to be provided inside the separation duct separation duct 58. However, if the light-receiving portion 65*b* is arranged outside the separation duct 58, the infrared rays emitted from the heater 43 of the drying portion 40 may strike the light-receiving portion 65*b* and this may lead to erroneous detection. Thus, the configuration of this embodiment in which the light-receiving portion 65*b* is arranged inside the separation duct 58 is preferable.

With the configuration according to the embodiment, downstream of the suction fan 51 and the second duct 54 are arranged the separation fan 52, the separation duct 58, the cooling fan 55, and the cooling duct 56, and the separation duct 58 and the cooling duct 56 are arranged so that at least parts of them overlap with each other as viewed from the width direction. It is thus possible to compactly arrange the separation duct 58 and the cooling duct 56.

The separation fan 52 used to separate the sheet P from the conveyance belt 22 and the cooling fan 55 are arranged side by side along the width direction horizontally orthogonal to the conveyance direction, and the cooling duct 56 extends from the cooling fan 55 toward the suction fan 51. With this design, the cooling duct 56 and the separation duct 58 are arranged side by side along the width direction and this contributes to further space saving.

Incorporating the suction fan 51, the separation fan 52, the cooling fan 55, the cooling duct 56, and the separation duct 58 into the suction fan unit 50 and making this removably attachable to the main body of the sheet drying apparatus 10 in the horizontal direction helps enhance the ease of attaching and removing the suction fan unit 50 and helps reduce the time required for unit replacement and maintenance.

Providing the preliminary drying portion 30 upstream of the drying portion 40 permits the sheet P, when passing through the preliminary drying portion 30, to be previously heated to a predetermined temperature, and this helps prevent a sudden change of the temperature of the sheet P and the ink due to the drying portion 40.

Arranging the second conveyance portion 70 below the drying portion 40 across the first conveyance portion 20 makes it difficult for the heat of the drying portion 40 to be transferred to the second conveyance portion 70, and this helps prevent the sheet P conveyed by the second conveyance portion 70 from becoming hot.

Owing to the light-receiving portion 65*b* of the sheet detection sensor 65 being arranged in the separation duct 58, the light-receiving portion 65*b* is constantly cooled by an air flow, and this makes it possible to arrange the light-receiving portion 65*b* near the drying portion 40 even though it becomes hot.

The present disclosure can be implemented in any manner other than as in the embodiment described above, and allows for any modifications without departure from the spirit of the present disclosure. For example, in the above embodiment, the light-receiving portion 65*b* of the sheet detection sensor 65 is arranged in the separation duct 58; instead, electronic components other than the sheet detection sensor 65 may be provided in the separation duct 58.

Figure 13:
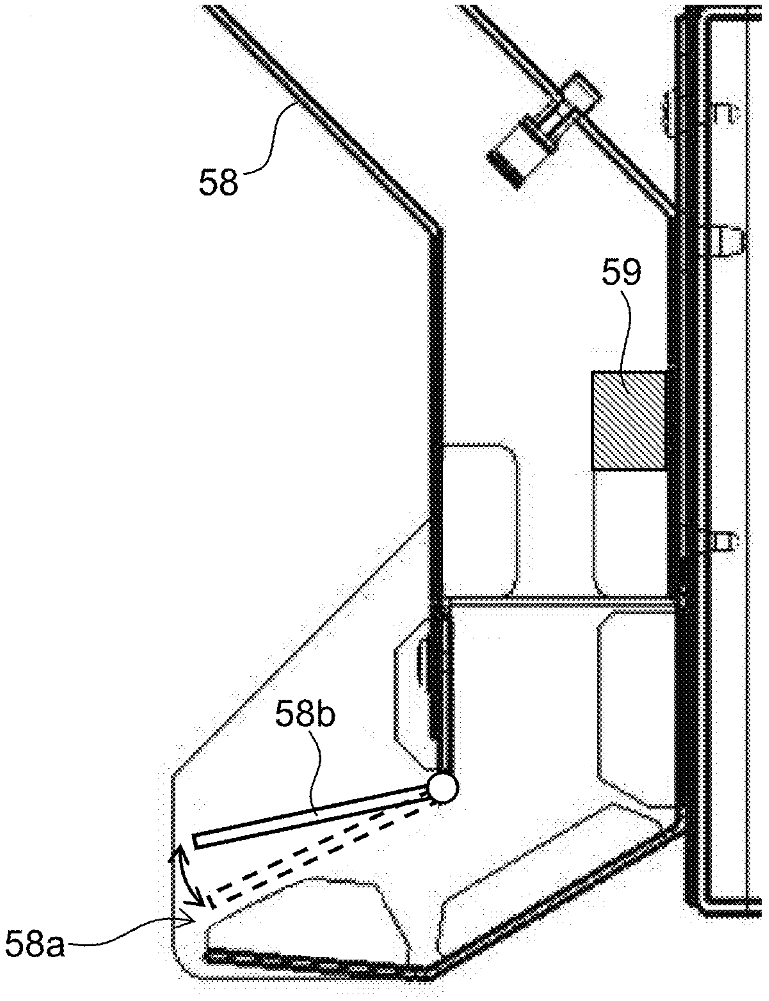
FIG. 13 is a diagram showing a modified example in which a separation air adjusting guide in a separation duct is movable.

For example, in a case where, as shown in FIG. 13, a separation air adjusting guide 58*b* is provided at the separation air blowing port 58*a* of the separation duct 58 and the opening width and the opening direction of the separation air blowing port 58*a* are adjustable, a guide driving motor 59 that swings the separation air adjusting guide 58*b* is arranged in the separation duct 58. It is thus possible to prevent the deterioration of guide driving motor 59 due to heat.

While the embodiment described above deals with a configuration where the sheet drying apparatus 10 is coupled to, as an example of the image forming system 200, an inkjet printer as an image forming apparatus 100, needles to say, the sheet drying apparatus 10 can be used independently without the image forming apparatus 100 coupled to it.

The present disclosure finds applications in sheet drying apparatuses that dry sheets on which images have been printed in inkjet recording apparatuses and the like. Based on the present disclosure, it is possible to provide a sheet drying apparatus in which a cooling unit for a suction fan that sucks in air containing water vapor and a unit for separating a sheet from a conveyance member can be arranged in a space-saving manner, and to provide an image forming system provided with such a sheet drying apparatus.

What is claimed is:

1. A sheet drying apparatus comprising
- a first conveyance portion that conveys a sheet on which an image is formed with ink containing moisture;
- a drying portion arranged opposite the first conveyance portion, the drying portion heating and drying the sheet;
- a suction fan that sucks in air containing water vapor present in a drying space between the first conveyance portion and the drying portion;
- an exhaust portion that discharges the air sucked in by the suction fan;
- a first duct that communicates the drying space with the suction fan; and
- a second duct that communicates the suction fan with the exhaust portion, wherein the suction fan and the second duct are arranged downstream of the drying portion with respect to a conveyance direction of the sheet, downstream of the suction fan and the second duct with respect to the conveyance direction are arranged
- a separation fan that blows air to the sheet being conveyed by the first conveyance portion to separate the sheet from the first conveyance portion at a separation position,
- a separation duct that communicates the separation fan with the separation position,
- a cooling fan that blows ambient air to cool the suction fan, and
- a cooling duct that communicates the cooling fan with the suction fan, and the separation duct and the cooling duct are arranged so that at least parts thereof overlap with each other as viewed from a width direction horizontally orthogonal to the conveyance direction.

2. The sheet drying apparatus according to claim 1, wherein the separation fan and the cooling fan are arranged side by side along the width direction.

3. The sheet drying apparatus according to claim 1, wherein the suction fan constitutes a suction fan unit together with the separation fan, the separation duct, the cooling fan, and the cooling duct, and the suction fan unit is removably attachable to a main body of the sheet drying apparatus.

4. The sheet drying apparatus according to claim 3, wherein downstream of the suction fan unit with respect to the conveyance direction is provided a retraction path in a shape of an arc where the sheet that has become useless is retracted and stored.

5. The sheet drying apparatus according to claim 1, wherein upstream of the drying portion with respect to the conveyance direction is provided a preliminary drying portion that preliminarily dries the sheet.

6. The sheet drying apparatus according to claim 1, further comprising:

a second conveyance portion arranged below the drying portion across the first conveyance portion, wherein the second conveyance portion has
- a reversing conveyance passage for reversing the sheet top side down and
- a duplex conveyance passage for returning, when duplex printing is performed on the sheet, the sheet reversed top side down to an image forming apparatus.

7. The sheet drying apparatus according to claim 1, wherein in the separation duct, an electronic component is arranged.

8. The sheet drying apparatus according to claim 7, further comprising:

a sheet discharge port arranged downstream of the first conveyance portion with respect to the conveyance direction, the sheet discharge port discharging the sheet therethrough, wherein downstream of the first conveyance portion and upstream of the sheet discharge port, with respect to the conveyance direction, a sheet detection sensor having a light-emitting portion and a light-receiving portion is arranged to detect the sheet, and in the separation duct, either the light-emitting portion or the light-receiving portion is arranged as the electronic component.

9. The sheet drying apparatus according to claim 8, wherein the drying portion includes a heating unit having a plurality of infrared heaters arranged opposite the first conveyance portion, and in the separation duct, the light-receiving portion is arranged as the electronic component.

10. An image forming system comprising:

an image forming apparatus that forms an image on a sheet with ink containing moisture; and the sheet drying apparatus according to claim 1 that is coupled to the image forming apparatus at a downstream side thereof with respect to the conveyance direction of the sheet, the sheet drying apparatus drying the sheet on which an image is formed by the image forming apparatus.

* * * * *